(12) United States Patent
Kawakami et al.

(10) Patent No.: US 11,032,621 B2
(45) Date of Patent: Jun. 8, 2021

(54) CONTENT DISTRIBUTION SERVER, TERMINAL DEVICE, CONTENT DISTRIBUTION SYSTEM, CONTENT DISTRIBUTION METHOD, CONTENT PLAY METHOD, CONTENT DISTRIBUTION PROGRAM, AND CONTENT PLAYER PROGRAM

(71) Applicant: DWANGO Co., Ltd., Tokyo (JP)

(72) Inventors: Nobuo Kawakami, Tokyo (JP); Hiroaki Saito, Tokyo (JP); Takashi Kojima, Tokyo (JP)

(73) Assignee: DWANGO, Co., Ltd., Tokyo (JP)

( * ) Notice: Subject to any disclaimer, the term of this patent is extended or adjusted under 35 U.S.C. 154(b) by 0 days.

(21) Appl. No.: 16/650,355

(22) PCT Filed: Sep. 27, 2018

(86) PCT No.: PCT/JP2018/035878
§ 371 (c)(1),
(2) Date: Mar. 24, 2020

(87) PCT Pub. No.: WO2019/065816
PCT Pub. Date: Apr. 4, 2019

(65) Prior Publication Data
US 2020/0304881 A1    Sep. 24, 2020

(30) Foreign Application Priority Data
Sep. 29, 2017    (JP) .............................. JP2017-190906

(51) Int. Cl.
*H04N 21/00*    (2011.01)
*H04N 5/76*    (2006.01)
(Continued)

(52) U.S. Cl.
CPC ..... *H04N 21/4852* (2013.01); *H04N 21/2187* (2013.01); *H04N 21/4307* (2013.01); *H04N 21/44218* (2013.01)

(58) Field of Classification Search
USPC .......................... 386/291, 298, 297, 296, 278
See application file for complete search history.

(56) References Cited

U.S. PATENT DOCUMENTS 5,504,933 A * 4/1996 Saito .................... G06Q 20/342
348/E7.056
5,548,346 A * 8/1996 Mimura ................. H04N 5/147
348/14.1
(Continued)

FOREIGN PATENT DOCUMENTS

JP    2004088466 A    3/2004
JP    2005011150 A    1/2005
(Continued)

OTHER PUBLICATIONS

English translation of Decision to Grant a Patent for JP Application No. 2017-190906, dated Nov. 2, 2018.
(Continued)

*Primary Examiner* — Daquan Zhao
(74) *Attorney, Agent, or Firm* — Dorsey & Whitney LLP

(57) ABSTRACT

A content distribution server, includes: a storage that stores live content received; a controller that controls distributing the live content stored in the storage as chase content to be played in a delayed manner from the live content received; and a communicator that distributes the live content and the chase content to a viewer terminal, wherein the controller changes a sound of the live content and distributes the sound having been changed to the viewer terminal through the communicator.

14 Claims, 10 Drawing Sheets

(51) Int. Cl.
*H04N 21/485* (2011.01)
*H04N 21/2187* (2011.01)
*H04N 21/43* (2011.01)
*H04N 21/442* (2011.01)
*H04N 5/91* (2006.01)

(56) References Cited

U.S. PATENT DOCUMENTS

| | | | |
|---|---|---|---|
| 9,386,354 B2* | 7/2016 | Archibong | G06F 3/048 |
| 2004/0045036 A1 | 3/2004 | Terasaki | |
| 2004/0257939 A1* | 12/2004 | Kawamura | H04N 5/76 369/47.23 |
| 2006/0245736 A1* | 11/2006 | Affaki | H04N 5/45 386/235 |

FOREIGN PATENT DOCUMENTS

| | | |
|---|---|---|
| JP | 2005039496 A | 2/2005 |
| JP | 2007150890 A | 6/2007 |
| JP | 2008187474 A | 8/2008 |
| JP | 2012049875 A | 3/2012 |

OTHER PUBLICATIONS

English translation of Reasons for Refusal for JP Application No. 2017-190906, dated Aug. 2, 2018.

\* cited by examiner

CONTENT DISTRIBUTION SERVER, TERMINAL DEVICE, CONTENT DISTRIBUTION SYSTEM, CONTENT DISTRIBUTION METHOD, CONTENT PLAY METHOD, CONTENT DISTRIBUTION PROGRAM, AND CONTENT PLAYER PROGRAM

RELATED APPLICATIONS

This application is a 371 National Stage application of International Application No. PCT/JP2018/035878, filed Sep. 27, 2018, which claims priority to Japanese Patent Application No. 2017-190906, filed on Sep. 29, 2017. The aforementioned applications are incorporated herein by reference, in its entirety, for any purposes.

TECHNICAL FIELD

The present disclosure relates to a content distribution server, a terminal device, a content distribution system, a content distribution method, a content play method, a content distribution program, and a content player program, for distributing live content and chase content.

BACKGROUND ART

Traditionally, there is a technology for selectively displaying images based on a video signal supplied in real time and a recorded video signal (a time shift video image) on a hard disk or memory and the like.

Further, as is suggested in Patent Document 1, there is a known technology that simultaneously displaying an image based on a video signal input in real time (live content) and a time shift video image (chase content) stored in a storage, so that a video image from the past is displayed at the same time while a real-time video image is displayed.

CITATION LIST

Patent Documents

PATENT DOCUMENT 1: Japanese Patent Application Publication No. 2005-39496.

SUMMARY OF THE INVENTION

Technical Problem

However, playing both the live content and the chase content mixes the sounds from both sets of content and makes it difficult to distinguish whether the sound is from the broadcast live content or from the chase-played content. Due to this, viewers may have a hard time distinguishing between the content of the live content broadcast on live and the chase-played content.

It is therefore an object of the present disclosure to provide a content distribution server, a terminal device, a content distribution system, a content distribution method, a content play method, a content distribution program, and a content player program which allow a viewer to distinguish between live content and chase content while playing the live content and the chase content at the same time.

Solution to the Problem

To solve the above problem, a content distribution server of the present disclosure includes: a storage that stores live content received; a controller that controls distributing the live content stored in the storage as chase content to be played in a delayed manner from the live content received; and a communicator that distributes the live content and the chase content to a viewer terminal, wherein the controller changes a sound of the live content and distributes the sound having been changed to the viewer terminal through the communicator.

Further, a terminal device of the present disclosure includes: a storage that stores live content received; a controller that controls playing the live content stored in the storage as chase content to be played in a delayed manner from the live content received; and a player that plays the live content and the chase content, wherein the controller changes a sound of the live content and causes the player to play the sound having been changed.

Further, a content distribution system of the present disclosure includes: a live content distribution device that transmits live content; a terminal device that allows viewing of content; and a content distribution server that receives the live content from the live content distribution device, the content distribution system further including a storage that stores the live content received; a controller that controls for playing the live content stored in the storage as chase content to be played in a delayed manner from the live content received; and a player that plays the live content and the chase content, wherein the controller changes a sound of the live content and plays the sound having been changed on the viewer terminal.

Further, a content distribution method of the present disclosure includes the steps of: storing, by a storage, live content received; controlling, by a controller, distributing the live content stored in the storage as chase content to be played in a delayed manner from the live content received; distributing, by a communicator, the live content and the chase content to a viewer terminal; and changing a sound of the live content and distributing the sound having been changed to the viewer terminal through the communicator, by the controller.

Further, a content play method of the present disclosure includes steps of: storing, by a storage, live content received; controlling, by a controller, playing the live content stored in the storage as chase content to be played in a delayed manner from the live content received; playing the live content and the chase content by a player; and changing a sound of the live content and causing the player to play the sound having been changed, by the controller.

Further, a content distribution program of the present disclosure implements, on a computer, steps of: storing live content received; controlling distributing the live content stored as chase content to be played in a delayed manner from the live content received; distributing the live content and the chase content to a viewer terminal; and changing a sound of the live content and distributing the sound having been changed to the viewer terminal.

Further, a content player program of the present disclosure implements, on a computer, steps of: storing live content received; controlling playing the live content stored as chase content to be played in a delayed manner from the live content received; playing the live content and the chase content; and changing a sound of the live content and playing the sound having been changed.

Advantages of the Invention

The above-described content distribution server, the terminal device, the content distribution system, the content distribution method, the content play method, the content distribution program, and the content player program allow a viewer to distinguish between live content and chase content, while allowing play of the live content and the chase content at the same time.

DESCRIPTION OF EMBODIMENTS

The following describes embodiments. It should be noted that the embodiments described below do not unduly limit the scope of claims of the present disclosure. Further, not all configurations of the embodiments described herein are essential in the present disclosure. The live content herein is the so-called live broadcast, such as live broadcast content of moving image or a sound, which allows a viewer to view in real time the content intended to be distributed by a distributor. Further, chase content is content played at a time later than a distribution time of the live content. The chase content is able to catch up with the live content, by raising the play speed of the chase content to be faster than the play speed of the live content.

First Embodiment

Figure 1:
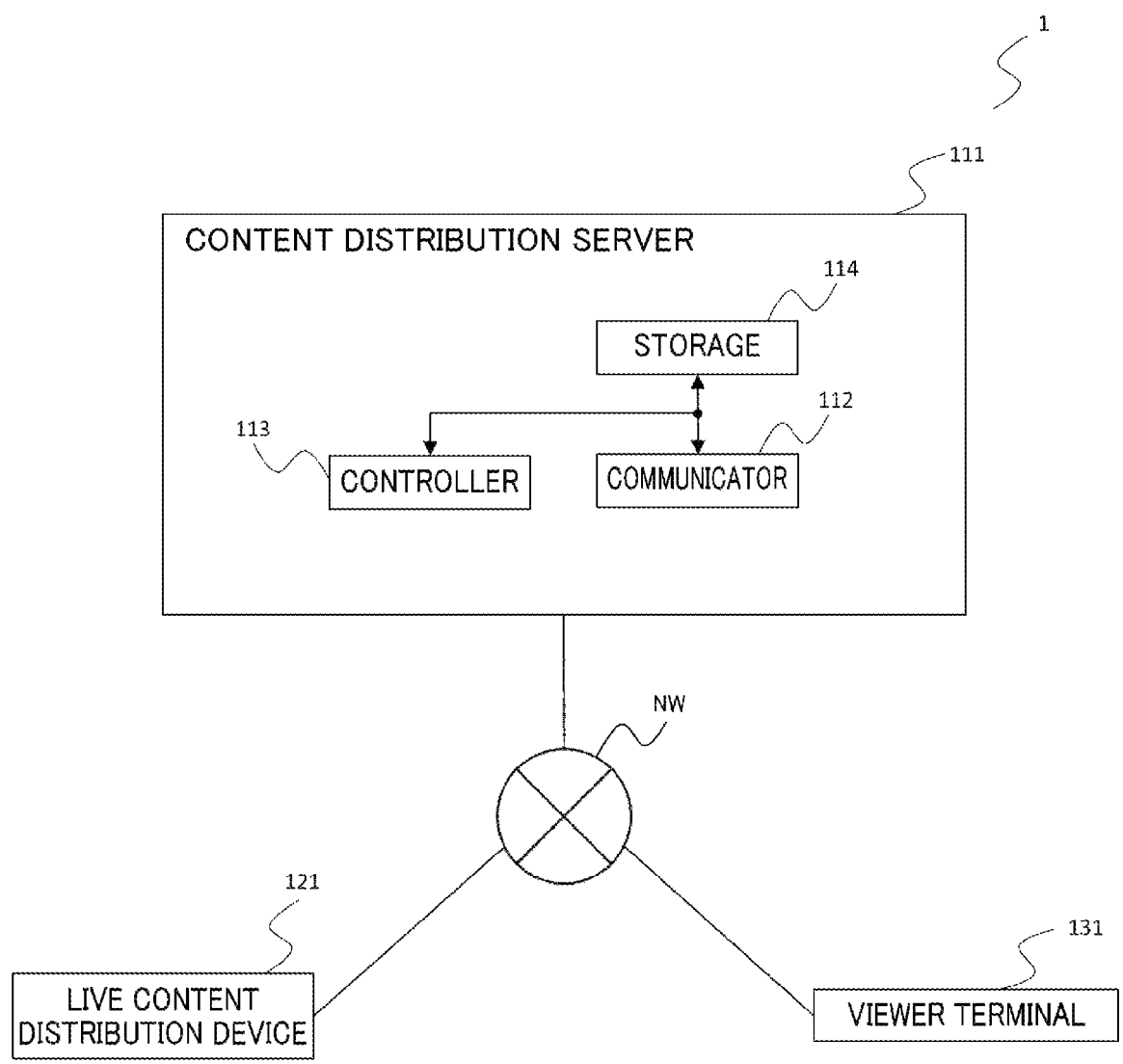
FIG. 1 is a schematic block diagram showing a configuration of a content distribution system 1 of a first embodiment to a fourth embodiment.

The following describes a first embodiment of the present disclosure, which is a content distribution system 1 that changes a sound of the live content and distributes the sound having been changed together with the chase content.
<Configuration>
First, with reference to FIG. 1, the following describes a configuration and an overview of a content distribution system 1 of the present embodiment, including a content distribution server 111 for distributing live content and chase content to a viewer.

As shown in FIG. 1, the content distribution system 1 of the present embodiment is configured such that the content distribution server 111, a live content distribution device 121, a viewer terminal 131 are connectable to a network NW such as the internet.

The content distribution server 111 is a server apparatus that distributes live content transmitted from the live content distribution device 121 to the viewer terminal 131. The content distribution server 111 includes a communicator 112, a controller 113, and a storage 114.

The communicator 112 serves as a communication interface that performs communication with the live content distribution device 121, and the viewer terminal 131 through the network NW. The communicator 112 receives live content transmitted from the live content distribution device 121 and a chase-request signal transmitted from the viewer terminal 131. Further, the communicator 112 distributes later-described chase content, live content, and the sound of the live content having been changed to the viewer terminal 131. Further, the communicator 112 may transmit/receive, as needed, login ID information of a distributor or a viewer to log in the content distribution server 111 via the live content distribution device 121 and the viewer terminal 131.

The controller 113 distributes live content received by the communicator 112 to the viewer terminal 131 from which a view request has been transmitted. Further, the controller 113 changes the play speed of the live content stored in the later-described storage 114 to generate the chase content. The controller 113, upon reception of a chase-request from the viewer terminal 131, calculates a time difference between the live content and the time of the request by the chase-request, and controls the play speed. Further, when the chase-request is received from the viewer terminal 131, the controller 113 changes the sound of the live content. The controller 113 distributes the sound of the live content having been changed as a sound of the live content to be distributed via the communicator 112.

The storage 114 stores the live content having been received by the communicator 112.

Next, the following describes a configuration and operation of the live content distribution device 121. The live content distribution device 121 is a device used by a content distributor, and is an information processing device such as a smartphone, a mobile phone, a personal handy phone system (PHS), a computer, a gaming device, a personal digital assistant (PDA), a portable gaming console, a watch, a smartwatch, a head-mounted display, a wearable display, an image generation device, and the like. Further, the live content distribution device 121 is connectable to the content distribution server 111 through the internet (WAN), a network NW such as LAN, or the like. Note that the communication channel between the live content distribution device 121 and the content distribution server 111 may be wired or wireless. The distributor creates live content for broadcasting on live by using the live content distribution device 121. The live content distribution device 121 transmits in real time the created live content to the content distribution server 111.

Next, the following describes a configuration and operation of the viewer terminal 131. The viewer terminal 131 is a terminal device used by a viewer, and is an information processing device such as a smartphone, a mobile phone, a personal handy phone system (PHS), a personal computer, a gaming device, a personal digital assistant (PDA), a portable gaming console, a watch, a smartwatch, a head-mounted display, a wearable display, an image generation device, and the like. Further, the viewer terminal 131 is connectable to the content distribution server 111 through the internet (WAN), a network NW such as LAN, or the like. Note that the communication channel between the viewer terminal 131 and the content distribution server 111 may be wired or wireless.

The live content distribution device 121 and the viewer terminal 131 may access the content distribution server 111 through exclusive application software installed. Further, the content distribution device 121 and the viewer terminal 131 may access the content distribution server 111 by using an operation environment (an Application Programming Interface (API), a platform, and the like) provided by the content distribution server 111 or by another server.

<Content>

Figure 2:
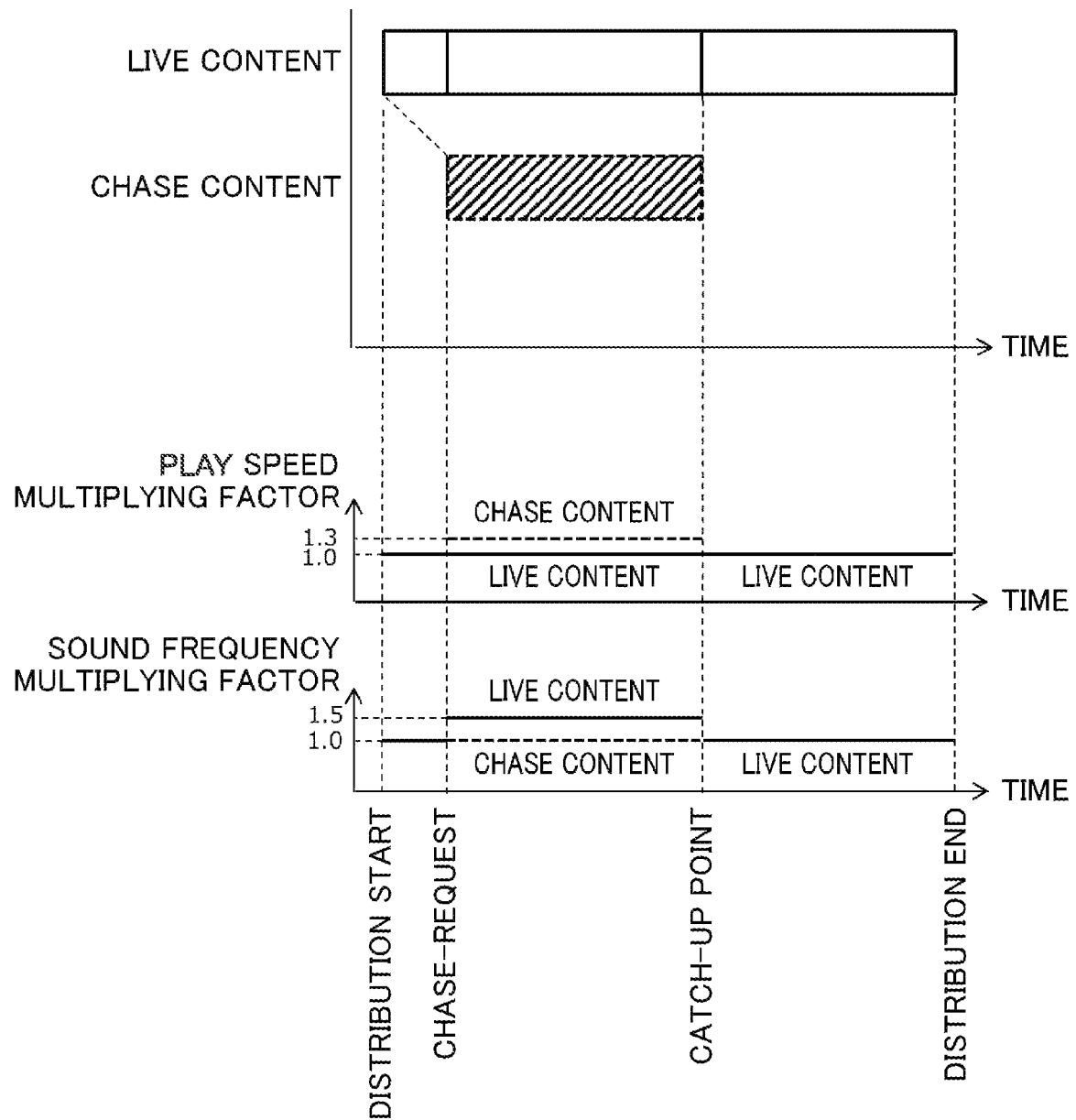
FIG. 2 is a conceptual scheme showing a content distribution state of the first embodiment.

The following describes content distributed from the content distribution server 111 of the first embodiment of the present disclosure, with reference to FIG. 2.

Regarding the content subjected to control by the content distribution server 111, FIG. 2 shows, from the top of the figure, the live content, the chase content, play speed multiplying factors of content, and sound frequency multiplying factors. The horizontal axis indicates the progress of time.

The live content shown in the first stage in FIG. 2 is distributed from the live content distribution device 121 to the viewer terminal 131 via the content distribution server 111 during a period from the start to the end of distribution.

The chase content is a shaded area in the second stage of FIG. 2, and is distributed from the live content distribution device 121 to the viewer terminal 131 via the content distribution server 111, in response to a chase-request from the viewer terminal 131. At a catch-up point indicated below, the video image displayed on the viewer terminal 131 returns to the live content. It should be noted that FIG. 2 illustrates a case where the chase content plays the content of the live content from the beginning of the distribution in a chasing manner. However, the chase content may start play from any part of the already-distributed content after the beginning.

The third stage in FIG. 2 shows the video image and the play speed of the sound of each set of content. As shown in FIG. 2, the live content is played at a reference speed of 1 times (actual speed) because it is broadcast on live. The chase content is played 1.3 times faster than the live content. Therefore, the chase content will catch up with the live content at the catch-up point.

The fourth stage in FIG. 2 shows multiplying factors for the sound frequency of each set of content to be changed. In FIG. 2, a frequency multiplying factor of 1 as the reference is based on the sound of live content transmitted from the live content distribution device 121. The frequency multiplying factor is the ratio of a sound frequency of the live content to a sound frequency of the same corresponding scene of the chase content. The sound of the live content is played with a 1.5 times higher frequency, from the chase-request until the catch-up point. In other words, the sound played is higher than the normal sound. The sound of the chase content is played 1.3 times faster, but with the frequency of 1 times. That is, while the play speed of the sound is fast, the pitch of the sound is the same as the sound normally played. Therefore, while the live content and the chase content are played at the same time, the sound of the live content is played at a higher pitch than the sound of the chase content. This allows the viewer to distinguish between the respective sounds of the sets of content. The chase content ends upon reaching the catch-up point, and the sound frequency of the live content played is brought back to 1 times.

<Process Flow>

Figure 3:
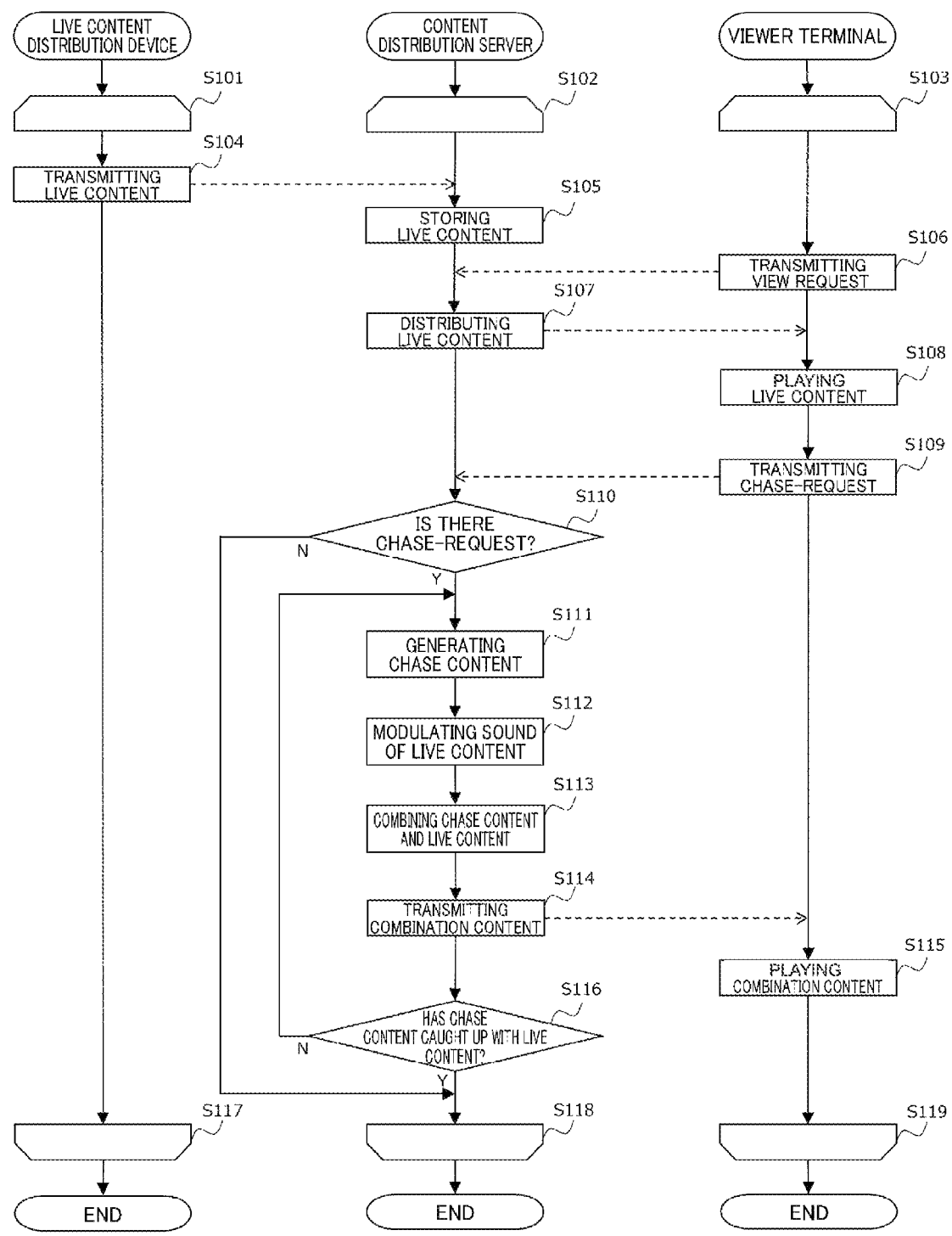
FIG. 3 is a flowchart explaining an operation of the content distribution system 1 of the first embodiment.

Next, with reference to the flowchart of FIG. 3, the following describes, operation of the content distribution system 1 of the first embodiment of the present disclosure. The flowchart of FIG. 3 shows how operations of the content distribution server 111, the live content distribution device 121, and the viewer terminal 131 are related to one another.

The live content distribution device 121 loops step S101 to step S117, while it distributes the live content. Similarly, the content distribution server 111 loops step S102 to step S118, in sync with the distribution of the live content by the live content distribution device 121. Further, the viewer terminal 131 loops step S103 to step S119, in sync with the live content distribution device 121 and the content distribution server 111.

In step S104, the live content distribution device 121 transmits a video image and a sound of the live content to the content distribution server 111. The live content may be a video image captured by the live content distribution device 121 or a video image captured by another device which is transmitted to the live content distribution device 121.

In step S105, the content distribution server 111 stores the live content transmitted from the live content distribution device 121. Specifically, the storage 114 stores the video image and the sound of the live content received via the communicator 112.

In step S106, the viewer transmits a view request for the live content he/she wishes to view from the viewer terminal 131 to the content distribution server 111.

In step S107, the content distribution server 111 distributes the video image and the sound of the live content to the viewer terminal 131 from which the view request for the live content has been transmitted in step S106.

In step S108, the viewer terminal 131 plays the video image and the sound of the live content transmitted in step S107.

In step S109, the viewer transmits a chase-request from the viewer terminal 131 to the content distribution server 111. Specifically, the viewer selects the time at which he/she wishes to view from a time axis of the live content having already been distributed, and requests play of the live content in a chasing manner, from the time selected.

In step S110, the content distribution server 111 determines whether there is a chase-request transmitted from the viewer terminal 131. When it is determined that there is a chase-request (Y), the controller 113 proceeds to step S111. When it is determined that there is no chase-request (N), the controller 113 proceeds to step S118.

In step S111, the controller 113 generates the chase content from the video image and the sound of the live content stored in the storage 114. The play speed of the chase content is set based on a time difference between the current time and a requested play start time of the live content, which is designated in the chase-request transmitted in step S110.

In step S112, the controller 113 changes the sound of the live content transmitted from the live content distribution device 121, and generates a changed sound. Specifically, the controller 113 modulates the frequency of the sound to a higher frequency than the original frequency. Note that the controller 113 may change the sound by modulating the sound to a lower frequency than the original frequency, change the tone of the sound from the original sound, or change the volume of the sound from the original volume. The sound of the live content may be muted, in cases of changing the sound volume. Other forms of conversions are adoptable as long as the viewer is able to recognize a change from the original sound.

In step S113, the controller 113 generates combination content obtained through combining the video image and the sound of the chase content generated in step S111 with the changed sound of the live content generated in step S112.

In step S114, the communicator 112 transmits the combination content generated in step S113 to the viewer terminal 131 from which the chase-request has been transmitted in step S109.

In step S115, the viewer terminal 131 plays the video image and the sound of the combination content transmitted in step S114. On the screen, only the video image of the chase content is displayed. Therefore, the viewer is able to concentrate on the video image of the chase content, while being able to know the progress of the live content by paying attention to the changed sound of the live content apart from the chase content.

In step S116, the controller 113 determines whether the chase content has caught up with the live content. When it is determined that the chase content has caught up with the live content (Y), the controller 113 proceeds to step S118. When it is determined that the chase content has not yet caught up with the live content (N), the controller 113 returns the process to step S111.

The live content distribution device 121 then loops step S101 to step S117, until the distribution of the live content ends. Similarly, the content distribution server 111 loops step S102 to step S118, in sync with the distribution of the live content by the live content distribution device 121. Further, the viewer terminal 131 loops step S103 to step S119, in sync with the live content distribution device 121 and the content distribution server 111.

<Effect>

As described above, the content distribution system 1 of the first embodiment of the present disclosure allows the viewer to view the chase content on the viewer terminal 131, while allowing the viewer to distinguish between the sound of the chase content and the sound of the live content. Thus, in a case where the viewer misses the live content, the viewer is able to know the real-time status of the live content, while concentrating on viewing the chase content played with a sound of a natural pitch, by listening and distinguishing the sound of the live content at a different pitch.

Note that, in step S113, the controller 113 may generate combination content containing the chase content generated in step S111, the changed sound of the live content generated in step S112, and the video image of the live content transmitted in step S104. In such a case, the video image and the sound of the chase content, and the video image and the changed sound of the live content are played in step S115. Playing both the video images and the sounds of the chase content and the live content allows the viewer to easily distinguish between the sound of the chase content and the sound of the live content. In this case, the video image of the live content and the video image of the chase content may be displayed side by side on the viewer terminal 131. Further, as in PinP (Picture-In-Picture), the video image of the live content may be displayed small in a screen displaying the video image of the chase content, or vice versa.

Further, the sound of the live content and the sound of the chase content may be allotted to and played from right and left speakers or headphones, respectively. This allows the viewer to easily distinguish between the sound of the live content and the sound of the chase content, based on which side the sound comes from.

Further, the content may be, for example, lessons and lectures distributed over the internet. In an actual lesson or the like taking place in real time, the viewer is able to view the lesson of the past at the same time, so as to deepen his/her understanding of unclear matters, while following the actual lesson in real time.

Second Embodiment

The following describes a second embodiment of the present disclosure, which is a content distribution system 1 that changes a sound of the live content and distributes the sound having been changed together with the chase content. In the second embodiment, the content distribution system 1 of the first embodiment will be described.

<Content>

Figure 4:
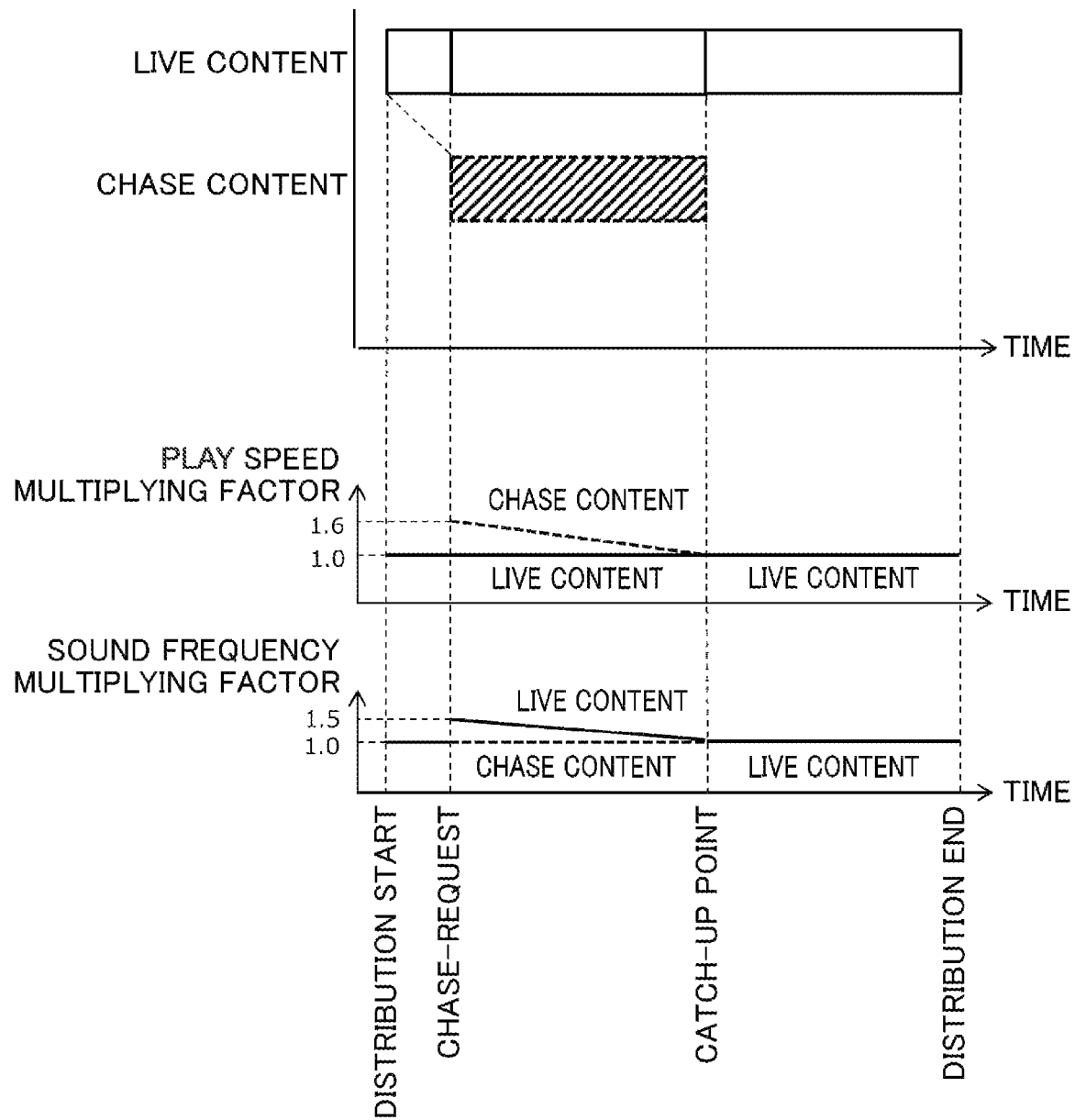
FIG. 4 is a conceptual scheme showing a content distribution state of the second embodiment.

The following describes content distributed from the content distribution server 111 of the second embodiment of the present disclosure, with reference to FIG. 4.

Regarding the content subjected to control by the content distribution server 111, FIG. 4 shows, from the top of the figure, the live content, the chase content, play speed multiplying factors of content, and sound frequency multiplying factors. The horizontal axis indicates the progress of time.

The live content shown in the first stage in FIG. 4 is distributed from the live content distribution device 121 to the viewer terminal 131 via the content distribution server 111 during a period from the start to the end of distribution.

The chase content is a shaded area in the second stage of FIG. 4, and is distributed from the live content distribution device 121 to the viewer terminal 131 via the content distribution server 111, in response to a chase-request from the viewer terminal 131. FIG. 2 illustrates a case where the chase content plays the content of the live content from the beginning of the distribution in a chasing manner.

The third stage in FIG. 4 shows the video image and the play speed of the sound of each set of content. As shown in FIG. 4, the live content is played at a reference speed of 1 times because it is broadcast on live. On the other hand, the chase content is played 1.6 times faster than the live content, at the beginning of play. The multiplying factor of the play speed is varied according to the time difference between the live content and the chase content, and gradually brought to 1 as the time difference is reduced. Then, the chase content will catch up with the live content at the catch-up point.

The fourth stage in FIG. 4 shows multiplying factors for the sound frequency of each set of content to be changed. In FIG. 4, a frequency multiplying factor of 1 as the reference is based on the sound of live content transmitted from the live content distribution device 121. When a chase-request occurs, the sound of the live content is played with a 1.5 times higher frequency. In other words, the sound played is higher than the normal sound. The multiplying factor for the frequency is varied according to the time difference between the live content and the chase content, and gradually brought to 1 as the time difference is reduced. That is, the degree of change (change in the frequency) is determined according to the time difference. Then, at the catch-up point, the frequency multiplying factor of the live content reaches 1. While the play speed of the chase content is varied from 1.6 times to 1 times, the sound of the chase content is played at a frequency of 1 times. That is, while the play speed of the sound is fast, the pitch of the sound is the same as the sound normally played. Therefore, while the live content and the chase content are played at the same time, the sound of the live content is played at a higher pitch than the sound of the chase content. This allows the viewer to distinguish between the respective sounds of the sets of content.

<Effect>

As described above, the content distribution system 1 of the second embodiment of the present disclosure is capable of varying the play speed of the chase content and the change in the pitch of the sound of the live content, according to the time difference between the live content and the chase content. As the chase content catches up with the live content, the multiplying factor of the play speed and the multiplying factor of the frequency are brought closer to 1, which makes switching over from the chase content to the live content natural to the viewer.

Third Embodiment

The following describes a third embodiment of the present disclosure, which is a content distribution system 1 that changes a sound of the live content and distributes the sound having been changed together with the chase content. In the third embodiment, the content distribution system 1 of the first embodiment will be described.
<Content>
The following describes content distributed from the content distribution server 111 of the third embodiment of the present disclosure, with reference to FIG. 5.

Figure 5:
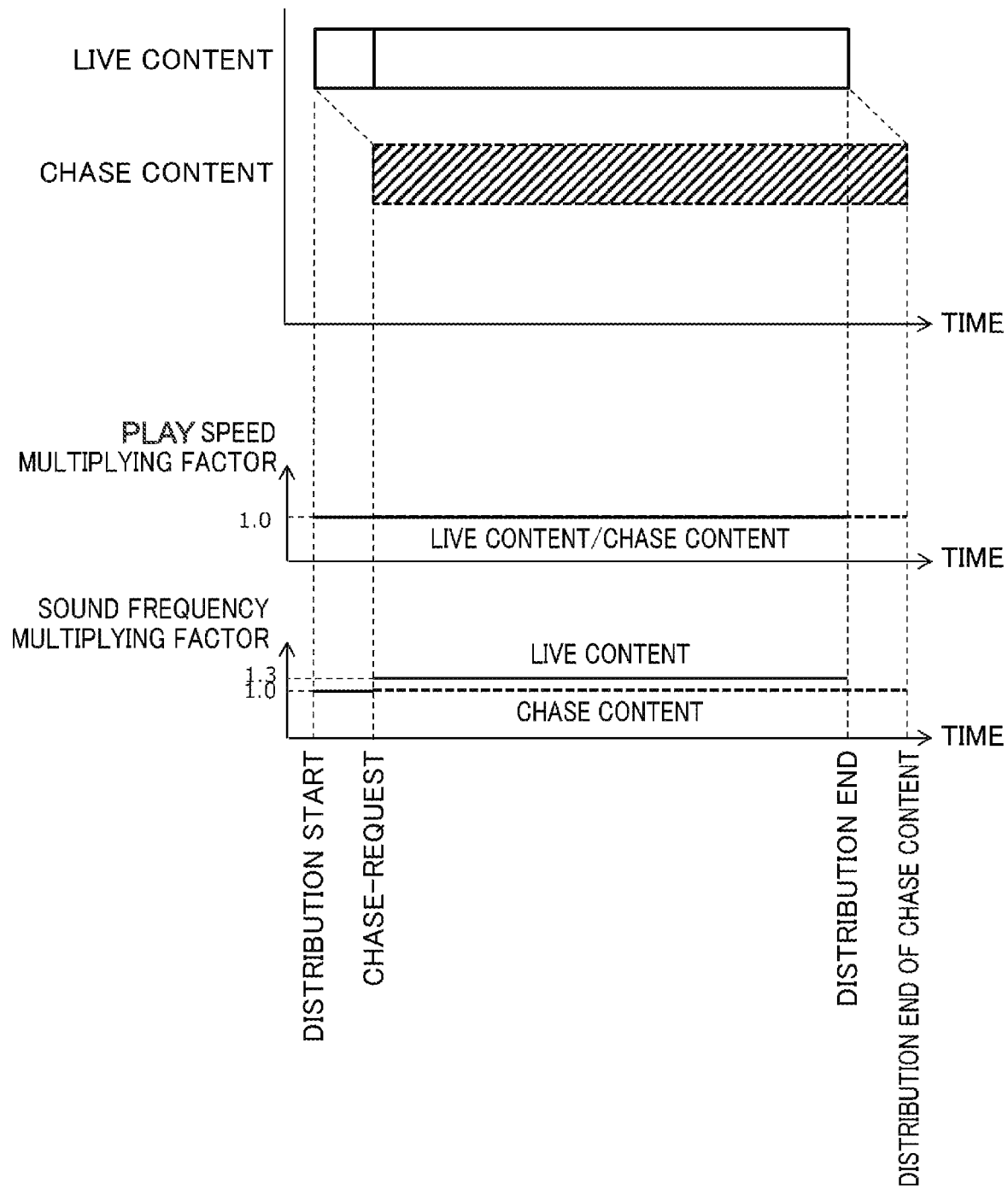
FIG. 5 is a conceptual scheme showing a content distribution state of the third embodiment.

Regarding the content subjected to control by the content distribution server 111, FIG. 5 shows, from the top of the figure, the live content, the chase content, play speed multiplying factors of content, and sound frequency multiplying factors. The horizontal axis indicates the progress of time.

The live content shown in the first stage in FIG. 5 is distributed from the live content distribution device 121 to the viewer terminal 131 via the content distribution server 111 during a period from the start to the end of distribution.

The chase content is a shaded area in the second stage of FIG. 5, and is distributed from the live content distribution device 121 to the viewer terminal 131 via the content distribution server 111, in response to a chase-request from the viewer terminal 131. FIG. 5 illustrates a case where the chase content plays the content of the live content from the beginning of the distribution in a chasing manner.

The third stage in FIG. 5 shows the video image and the play speed of the sound of each set of content. As shown in FIG. 5, the live content is played at a reference speed of 1 times because it is broadcast on live. The chase content is also played at the speed of 1 times, which is the same speed as the live content. That is, the chase content is played with its time shifted from the live content (time shifting).

The fourth stage in FIG. 5 shows multiplying factors for the sound frequency of each set of content to be changed. In FIG. 3, a frequency multiplying factor of 1 as the reference is based on the sound of live content transmitted from the live content distribution device 121. The sound of the live content is played at a 1.3 times higher frequency, from the chase-request until the catch-up point. In other words, the sound played is higher than the normal sound. While the play speed of the chase content is 1.3 times faster, the sound of the chase content is played at a frequency of 1 times. That is, while the play speed of the sound is fast, the pitch of the sound is the same as the sound normally played. Therefore, while the live content and the chase content are played at the same time, the sound of the live content is played at a higher pitch than the sound of the chase content. This allows the viewer to distinguish between the respective sounds of the sets of content.
<Effect>
As described above, the content distribution system 1 of the third embodiment of the present disclosure plays the chase content at the same play speed as the live content, and uses so-called time shifting for play of the chase content. Thus, in a case where the viewer misses the live content, the viewer is able to know the real-time status of the live content, while concentrating on the chase content played at the normal speed.

Fourth Embodiment

The following describes a fourth embodiment of the present disclosure, which is a content distribution system 1 that notifies a user-engagement level based on user-posts superimposed and displayed on the live content. The content distribution system 1 of the first embodiment is used to describe the fourth embodiment.
<Content>
The following describes content distributed from the content distribution server 111 of the fourth embodiment of the present disclosure, with reference to FIG. 6.

Figure 6:
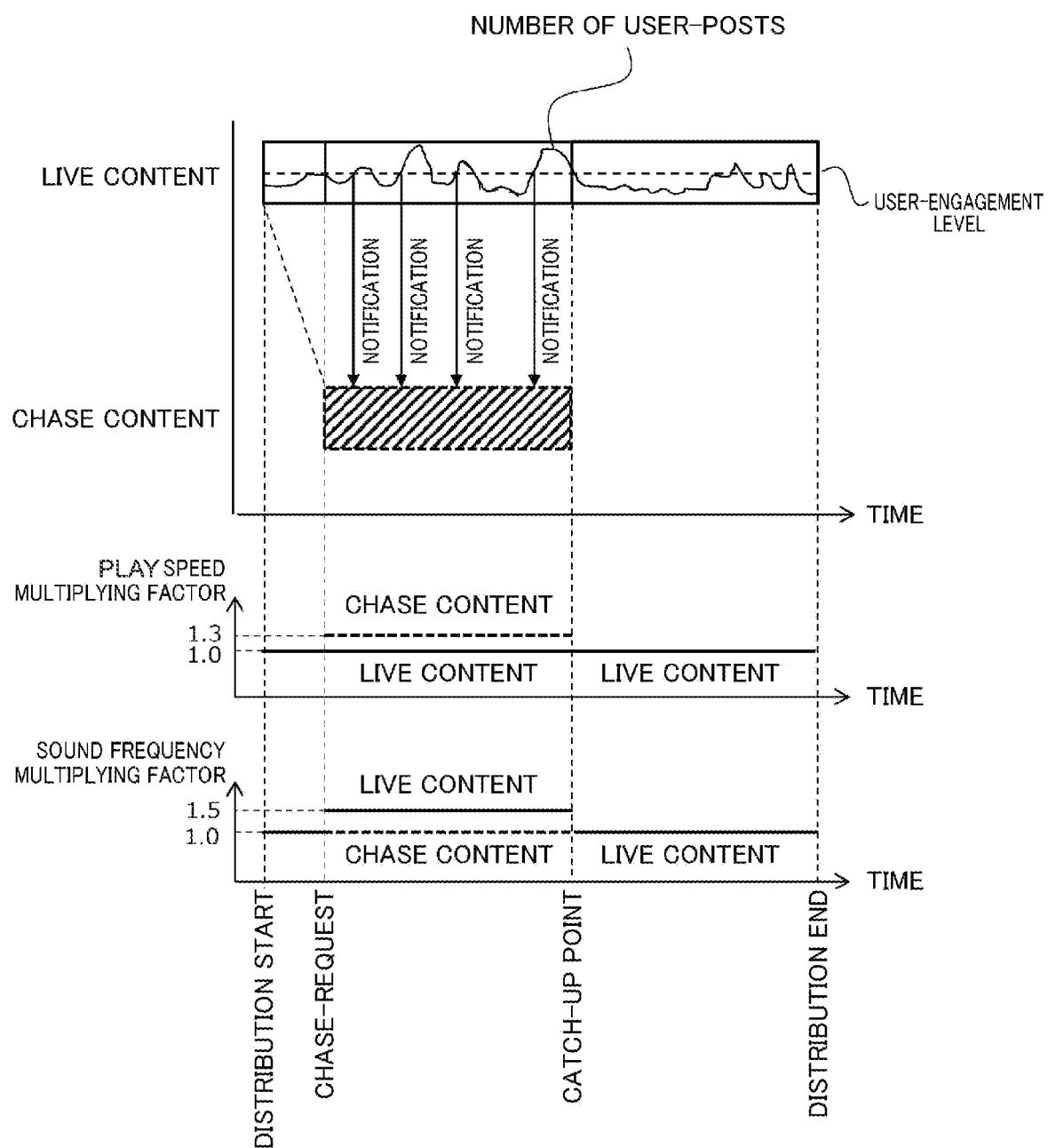
FIG. 6 is a conceptual scheme showing a content distribution state of a fourth embodiment.

Regarding the content subjected to control by the content distribution server 111, FIG. 6 shows, from the top of the figure, the live content (including indication of changes in the number of user-posts), the chase content, play speed multiplying factors of content, and sound frequency multiplying factors. The horizontal axis indicates the progress of time. The user-post is information associated to the live content, and encompasses text, designs, and audio data posted from the viewer terminal 131 and the like with respect to the content data. Examples of the text data include comments such as friendly jibes and impressions of users on the content data, and the examples of the designs include icons, stamps, and the like. Further, the user-posts encompasses information posted by the distributor of the content, and information posted by an administrator of the content distribution server 111.

The live content shown in the first stage in FIG. 6 is distributed from the live content distribution device 121 to the viewer terminal 131 via the content distribution server 111 during a period from the start to the end of distribution. The bar indicating the live content has a superimposed diagram showing changes in the number of user-posts per unit time. The vertical axis indicates the number of user-posts. Further, the broken line indicates a threshold for determining the user-engagement level with the content, based on the number of user-posts. The number of user-posts exceeding the threshold means a high user-engagement level with the content. When the content distribution server 111 determines a high user-engagement level, the content distribution server 111 notifies the viewer terminal 131. This notification is executed during play of the chase content. Further, the notification may be an alert sound superimposed on the sound of the content or an alert superimposed and displayed on the video image of the content.

The chase content is a shaded area in the second stage of FIG. 6, and is distributed from the live content distribution device 121 to the viewer terminal 131 via the content distribution server 111, in response to a chase-request from the viewer terminal 131. At a catch-up point indicated below, the video image displayed on the viewer terminal 131 returns to the live content. It should be noted that FIG. 6 illustrates a case where the chase content plays the content of the live content from the beginning of the distribution in a chasing manner. However, the chase content may start play from any part of the already-distributed content after the beginning.

The third stage in FIG. 6 shows the video image and the play speed of the sound of each set of content. As shown in FIG. 6, the live content is played at a reference speed of 1 times because it is broadcast on live. The chase content is played 1.3 times faster than the live content. Therefore, the chase content will catch up with the live content at the catch-up point.

The fourth stage in FIG. 6 shows multiplying factors for the sound frequency of each set of content to be changed. In FIG. 6, a frequency multiplying factor of 1 as the reference is based on the sound of live content transmitted from the live content distribution device 121. The sound of the live content is played with a 1.5 times higher frequency, from the chase-request until the catch-up point. In other words, the sound played is higher than the normal sound. The sound of the chase content is played 1.3 times faster, but with the frequency of 1 times. That is, while the play speed of the sound is fast, the pitch of the sound is the same as the sound normally played. Therefore, while the live content and the chase content are played at the same time, the sound of the live content is played at a higher pitch than the sound of the chase content. This allows the viewer to distinguish between the respective sounds of the sets of content. The chase content ends upon reaching the catch-up point, and the sound frequency of the live content played is brought back to 1 times.

<Process Flow>

Figure 7:
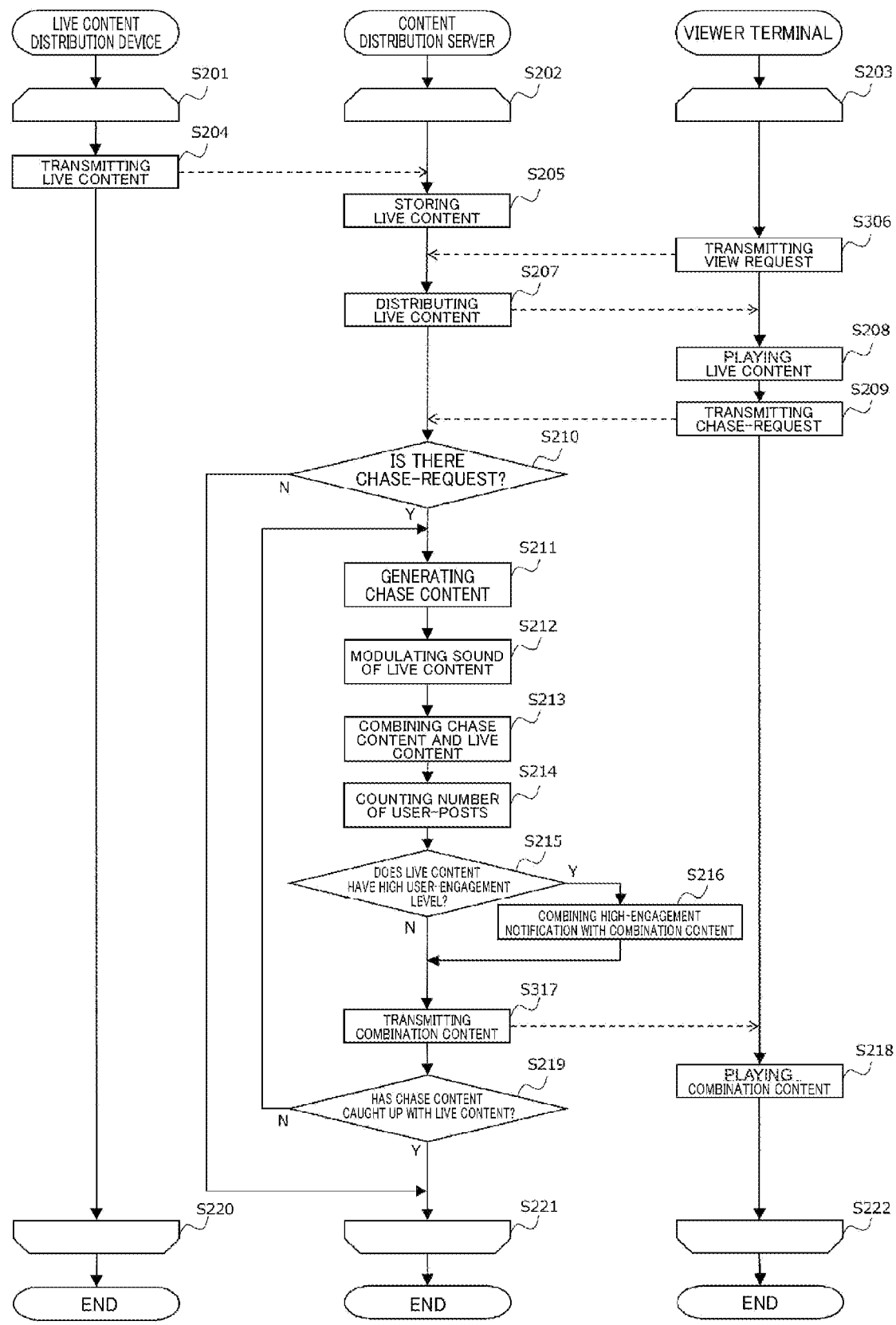
FIG. 7 is a flowchart explaining an operation of the content distribution system 1 of the fourth embodiment.

Next, with reference to the flowchart of FIG. 7, the following describes, operation of the content distribution system 1 of the fourth embodiment of the present disclosure. The flowchart of FIG. 7 shows how operations of the content distribution server 111, the live content distribution device 121, and the viewer terminal 131 are related to one another.

The live content distribution device 121 loops step S201 to step S220, while it distributes the live content. Similarly, the content distribution server 111 loops step S202 to step S221, in sync with the distribution of the live content by the live content distribution device 121. Further, the viewer terminal 131 loops step S203 to step S222, in sync with the live content distribution device 121 and the content distribution server 111.

In step S204, the live content distribution device 121 transmits a video image and a sound of the live content to the content distribution server 111. The live content may be a video image captured by the live content distribution device 121 or a video image captured by another device which is transmitted to the live content distribution device 121.

In step S205, the content distribution server 111 stores the live content transmitted from the live content distribution device 121. Specifically, the storage 114 stores the video image and the sound of the live content received via the communicator 112.

In step S206, the viewer transmits a view request for the live content he/she wishes to view from the viewer terminal 131 to the content distribution server 111.

In step S207, the content distribution server 111 distributes the video image and the sound of the live content to the viewer terminal 131 from which the view request for the live content has been transmitted in step S206.

In step S208, the viewer terminal 131 plays the video image and the sound of the live content transmitted in step S207.

In step S209, the viewer transmits a chase-request from the viewer terminal 131 to the content distribution server 111. Specifically, the viewer selects the time at which he/she wishes to view from a time axis of the live content having already been distributed, and requests play of the live content in a chasing manner, from the time selected.

In step S210, the content distribution server 111 determines whether there is a chase-request transmitted from the viewer terminal 131. When it is determined that there is a chase-request (Y), the controller 113 proceeds to step S211. When it is determined that there is no chase-request (N), the controller 113 proceeds to step S221.

In step S211, the controller 113 generates the chase content from the video image and the sound of the live content stored in the storage 114. The play speed of the chase content is set based on a time difference between the current time and a requested play start time of the live content, which is designated in the chase-request transmitted in step S210.

In step S212, the controller 113 changes the sound of the live content transmitted from the live content distribution device 121, and generates a changed sound. Specifically, the controller 113 modulates the frequency of the sound to a higher frequency than the original frequency. Note that the controller 113 may change the sound by modulating the sound to a lower frequency than the original frequency, change the tone of the sound from the original sound, or change the volume of the sound from the original volume. Other forms of conversions are adoptable as long as the viewer is able to recognize a change from the original sound.

In step S213, the controller 113 generates combination content obtained through combining the chase content generated in step S211 with the changed sound of the live content generated in step S212.

In step S214, the controller 113 counts the number of user-posts with respect to the live content. Each user-post is posted in real time with respect to the live content, and the number of user-posts per unit time can be used as an index for the user-engagement level with the live content. Such an index may be the number of characters in the user-post, instead of the number of user-posts.

In step S215, the controller 113 determines whether the number of user-posts with respect to the live content exceeds the threshold. If the number exceeds the threshold, the controller 113 determines that the live content has a high user-engagement level (Y), and proceeds to step S216. When the controller 113 determines that the content does not have a high user-engagement level (N), the controller 113 proceeds to step S217. The threshold may be set by an administrator of the content distribution server 111 or set by viewers on their viewer terminals 131. The threshold may be set to a higher value if, for example, the viewers feel that the user-engagement level of the content is determined as to be high too frequently.

In step S216, the controller 113 combines a high-engagement notification with a combination content generated in step S213. Specifically, an alert sound indicating a high user-engagement level is combined with the combination content. Further, an alert may be superimposed and displayed in the video image of the chase content contained in the combination content.

In step S217, the communicator 112 transmits the combination content generated in step S213 to the viewer terminal 131 from which the chase-request has been transmitted in step S209.

In step S218, the viewer terminal 131 plays the video image and the sound of the combination content transmitted in step S217.

In step S219, the controller 113 determines whether the chase content has caught up with the live content. When it is determined that the chase content has caught up with the live content (Y), the controller 113 proceeds to step S218. When it is determined that the chase content has not yet caught up with the live content (N), the controller 113 returns the process to step S211.

The live content distribution device 121 then loops step S201 to step S220, until the distribution of the live content ends. Similarly, the content distribution server 111 loops step S202 to step S221, in sync with the distribution of the live content by the live content distribution device 121. Further, the viewer terminal 131 loops step S203 to step S222, in sync with the live content distribution device 121 and the content distribution server 111.

<Effect>

As described above, the content distribution system 1 of the fourth embodiment of the present disclosure is capable of determining the user-engagement level with the live content, based on the number of user-posts with respect to the live content, and notify the viewer viewing the chase content of the user-engagement level. Thus, the viewer is able to know the user-engagement level with the live content, while concentrating on the chase content, and is able to suitably switch over to play of the live content.

When it is determined that the live content has a high user-engagement level, the viewer terminal 131 may play the live content together with the chase content, or play the live content instead of playing the chase content.

Note that the user-posts posted with respect to the live content may be subjected to character recognition to synthesize audio sound and superimpose and play the sound synthesized on the live content.

Fifth Embodiment

The following describes a fifth embodiment of the present disclosure, which is a content distribution system 2 that changes a sound of the live content in the viewer terminal and plays the sound having been changed together with the chase content.

<Configuration>

Figure 8:
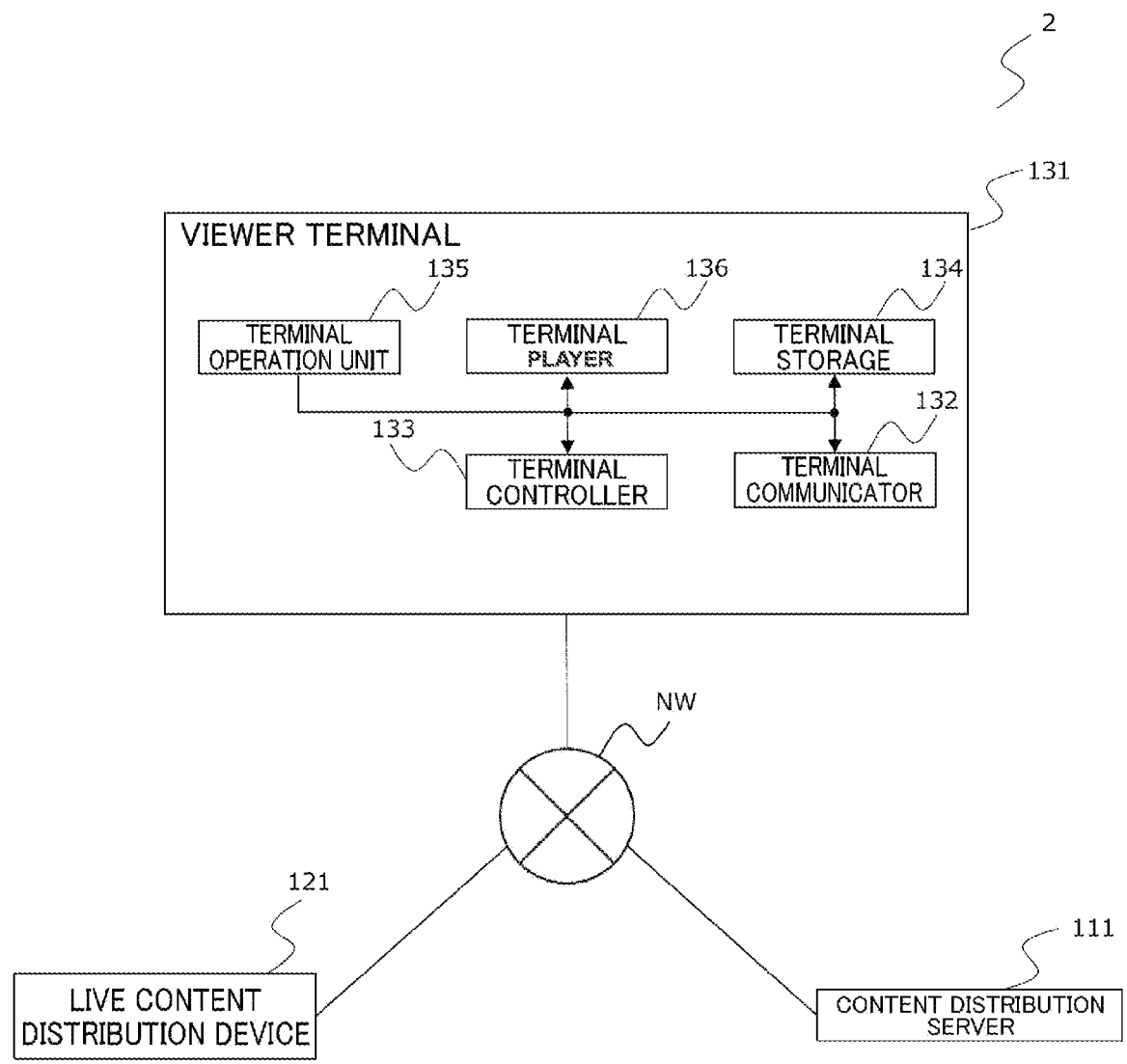
FIG. 8 is a schematic block diagram showing a configuration of a content distribution system 2 of a fifth embodiment.

First, with reference to FIG. 8, the following describes a configuration and an overview of the content distribution system 2 of the present embodiment, including a content distribution server 111 for distributing live content to viewers and a viewer terminal 131 configured to generate and plays chase content.

As shown in FIG. 8, the content distribution system 2 of the present embodiment is configured such that the content distribution server 111, a live content distribution device 121, a viewer terminal 131 are connectable to a network NW such as the internet.

The content distribution server 111 distributes live content transmitted from the live content distribution device 121 described below to the viewer terminal 131.

Next, the following describes a configuration and operation of the live content distribution device 121. The live content distribution device 121 is a device used by a content distributor, and is an information processing device such as a smartphone, a mobile phone, a personal handy phone system (PHS), a personal computer, a gaming device, a personal digital assistant (PDA), a portable gaming console, a watch, a smartwatch, a head-mounted display, a wearable display, an image generation device, and the like. Further, the live content distribution device 121 is connectable to the content distribution server 111 through the internet (WAN), a network NW such as LAN, or the like. Note that the communication channel between the live content distribution device 121 and the content distribution server 111 may be wired or wireless. The distributor creates live content for broadcasting on live by using the live content distribution device 121. The live content distribution device 121 transmits in real time the created live content to the content distribution server 111.

Next, the following describes a configuration and operation of the viewer terminal 131. The viewer terminal 131 is a terminal device used by a viewer, and is an information processing device such as a smartphone, a mobile phone, a personal handy phone system (PHS), a personal computer, a gaming device, a personal digital assistant (PDA), a portable gaming console, a watch, a smartwatch, a head-mounted display, a wearable display, an image generation device, and the like. Further, the viewer terminal 131 is connectable to the content distribution server 111 through the internet (WAN), a network NW such as LAN, or the like. Note that the communication channel between the viewer terminal 131 and the content distribution server 111 may be wired or wireless. The viewer terminal 131 includes a terminal communicator 132, a terminal controller 133, a terminal storage 134, a terminal operation unit 135, and a terminal player 136.

The terminal communicator 132 serves as a communication interface that performs communication with the content distribution server 111 through the network NW. The terminal communicator 132 receives live content distributed by the content distribution server 111.

Further, the terminal controller 133 changes the play speed of the live content stored in the later described terminal storage 134 to generate the chase content. The terminal controller 133, upon reception of a chase-request from the terminal operation unit 135, calculates a time difference between the live content and the time of the request by the chase-request, and controls the play speed. Further, when the chase-request is received from the terminal operation unit 135, the terminal controller 133 changes the sound of the live content. The controller 113 causes the terminal player 136 to play the sound of the live content having been changed as a sound of the live content.

The terminal storage 134 stores the live content having been received by the terminal communicator 132.

The terminal operation unit 135 is a key device or a touch panel for a viewer using the viewer terminal 131 to operate the viewer terminal 131.

The terminal player 136 is a display device such as a liquid crystal display or an organic electroluminescent display and a speaker device, for playing the video images and the sounds of the live content and the chase content. A headphone may be used instead of a speaker.

The live content distribution device 121 and the viewer terminal 131 may access the content distribution server 111 through exclusive application software installed. Further, the content distribution device 121 and the viewer terminal 131 may access the content distribution server 111 by using an operation environment (an Application Programming Interface (API), a platform, and the like) provided by the content distribution server 111 or by another server.

<Content>

The content distribution server 111 of the fifth embodiment of the present disclosure is the same as the one described in the first embodiment with reference to FIG. 2, and the description thereof is omitted.

<Process Flow>

Figure 9:
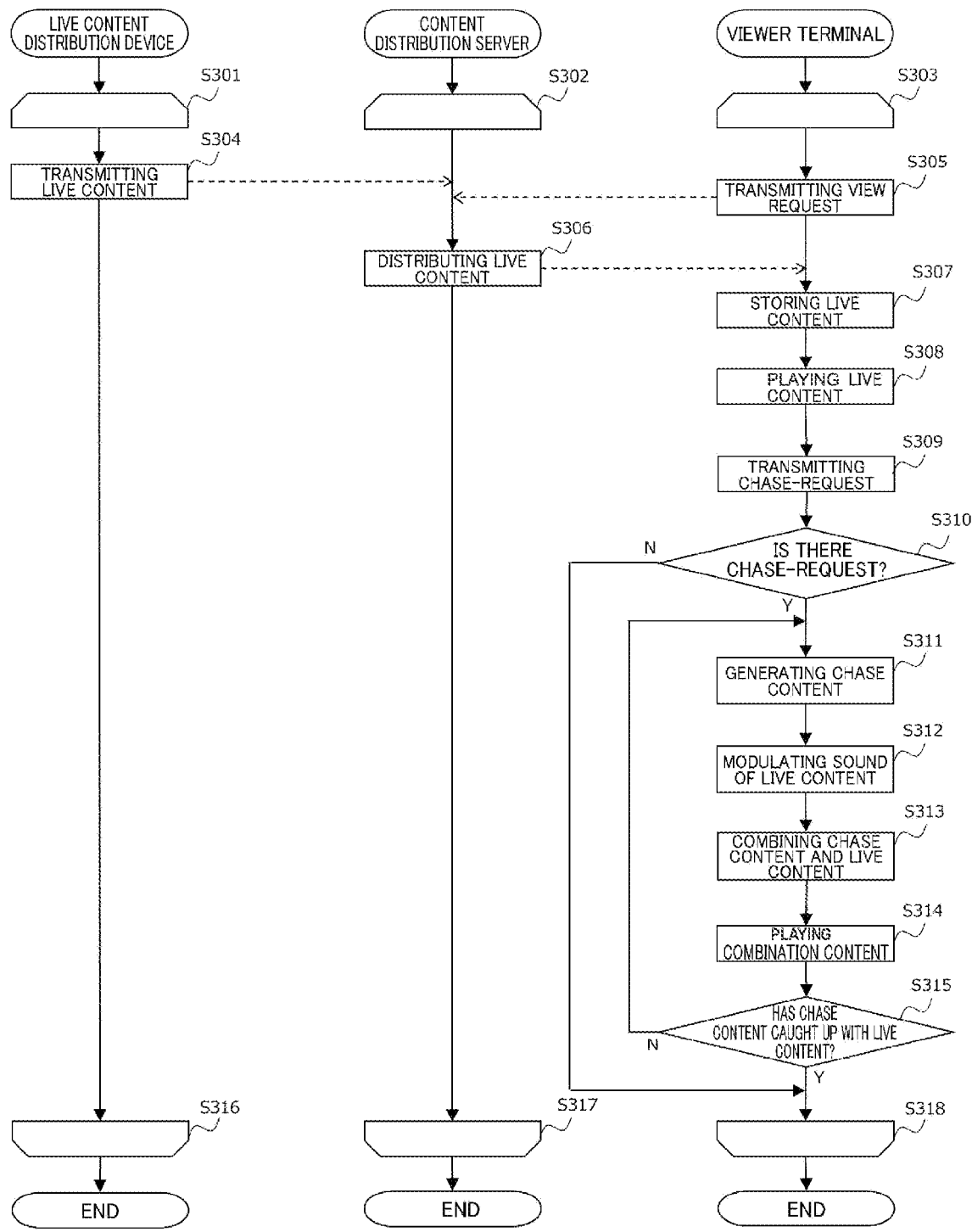
FIG. 9 is a flowchart explaining an operation of the content distribution system 2 of the fifth embodiment.

Next, with reference to the flowchart of FIG. 9, the following describes, operation of the content distribution system 2 of the fifth embodiment of the present disclosure. The flowchart of FIG. 9 shows how operations of the content distribution server 111, the live content distribution device 121, and the viewer terminal 131 are related to one another.

The live content distribution device 121 loops step S301 to step S316, while it distributes the live content. Similarly, the content distribution server 111 loops step S302 to step S317, in sync with the distribution of the live content by the live content distribution device 121. Further, the viewer terminal 131 loops step S303 to step S318, in sync with the live content distribution device 121 and the content distribution server 111.

In step S304, the live content distribution device 121 transmits a video image and a sound of the live content to the content distribution server 111. The live content may be a video image captured by the live content distribution device 121 or a video image captured by another device which is transmitted to the live content distribution device 121.

In step S305, the viewer transmits a view request for the live content he/she wishes to view from the viewer terminal 131 to the content distribution server 111.

In step S306, the content distribution server 111 distributes the video image and the sound of the live content to the viewer terminal 131 from which the view request for the live content has been transmitted in step S305.

In step S307, the viewer terminal 131 stores the live content transmitted from the content distribution server 111. Specifically, the terminal storage 134 stores the video image and the sound of the live content received via the terminal communicator 132.

In step S308, the viewer terminal 131 plays the video image and the sound of the live content transmitted in step S307.

In step S309, the viewer inputs a chase-request through the terminal operation unit 135. Specifically, the viewer selects the time at which he/she wishes to view from a time axis of the live content having already been distributed, and requests play of the live content in a chasing manner, from the time selected.

In step S310, the terminal controller 133 determines whether there is a chase-request input through the terminal operation unit 135. When it is determined that there is a chase-request (Y), the terminal controller 133 proceeds to step S311. When it is determined that there is no chase-request (N), the terminal controller 133 proceeds to step S318.

In step S311, the terminal controller 133 generates the chase content from the video image and the sound of the live content stored in the terminal storage 134. The play speed of the chase content is set based on a time difference between the current time and a requested play start time of the live content, which is designated in the chase-request input in step S310.

In step S312, the terminal controller 133 changes the sound of the live content transmitted from the content distribution server 111, and generates a changed sound. Specifically, the terminal controller 133 modulates the frequency of the sound to a higher frequency than the original frequency. Note that the terminal controller 133 may change the sound by modulating the sound to a lower frequency than the original frequency, change the tone of the sound from the original sound, or change the volume of the sound from the original volume. Other forms of conversions are adoptable as long as the viewer is able to recognize a change from the original sound.

In step S313, the terminal controller 133 generates combination content obtained through combining the video image and the sound of the chase content generated in step S311 with the changed sound of the live content generated in step S312.

In step S314, the viewer terminal 131 plays the video image and the sound of the combination content transmitted in step S313. On the screen, only the video image of the chase content is displayed. Therefore, the viewer is able to concentrate on the video image of the chase content, while being able to know the progress of the live content by paying attention to the changed sound of the live content apart from the chase content.

In step S315, the terminal controller 133 determines whether the chase content has caught up with the live content. When it is determined that the chase content has caught up with the live content (Y), the terminal controller 133 proceeds to step S118. When it is determined that the chase content has not yet caught up with the live content (N), the terminal controller 133 returns the process to step S111.

The live content distribution device 121 then loops step S301 to step S316, until the distribution of the live content ends. Similarly, the content distribution server 111 loops step S302 to step S317, in sync with the distribution of the live content by the live content distribution device 121. Further, the viewer terminal 131 loops step S303 to step S318, in sync with the live content distribution device 121 and the content distribution server 111.

<Effect>

As described above, the content distribution system 2 of the fifth embodiment of the present disclosure allows the viewer to view the chase content on the viewer terminal 131, while allowing the viewer to distinguish between the sound of the chase content and the sound of the live content, without a need for using a service by the content distribution server 111. Thus, in a case where the viewer misses the live content, the viewer is able to know the real-time status of the live content, while concentrating on viewing the chase content played with a sound of a natural pitch, by listening and distinguishing the sound of the live content at a different pitch.

(Program)

Figure 10:
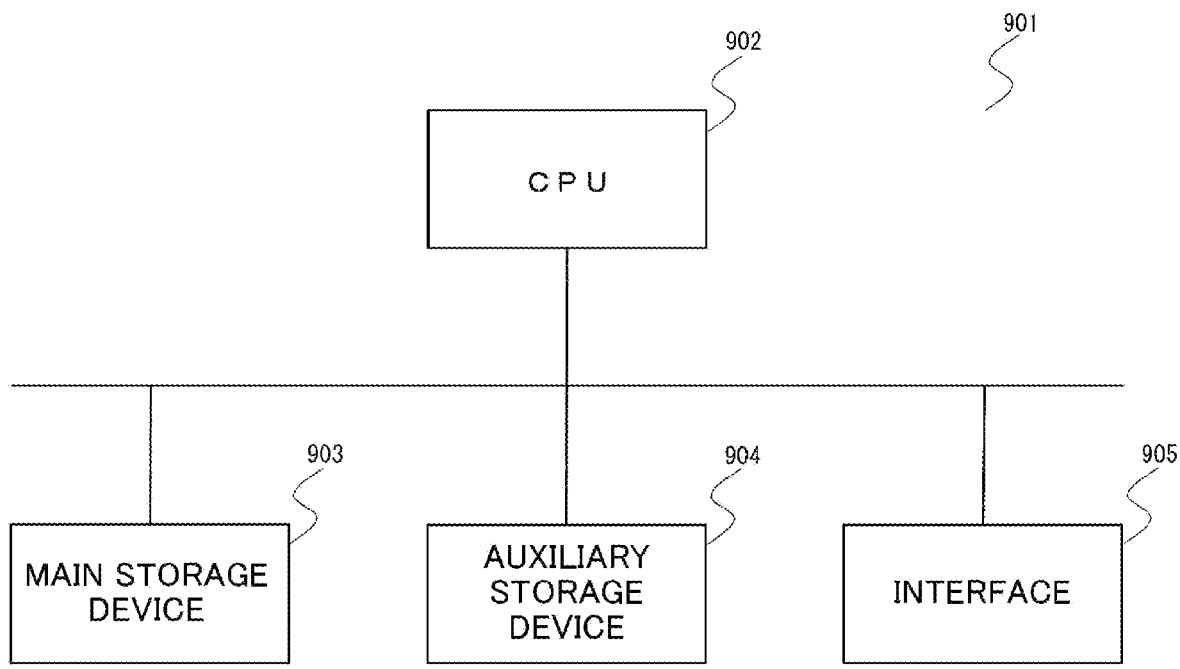
FIG. 10 is a schematic block diagram showing a configuration of a computer of the embodiment.

FIG. 10 is a schematic block diagram showing a configuration of a computer 901. The computer 901 includes a CPU 902, a main storage device 903, an auxiliary storage device 904, and an interface 905.

The following details a program that achieves functions constituting the content distribution server 111 related to the embodiments of the present disclosure.

The content distribution server 111 is implemented on the computer 901. The operations of elements constituting the content distribution server 111 are stored in the auxiliary storage device 904, in the form of a program. The CPU 902 reads out the program from the auxiliary storage device 904, and loads the program into the main storage device 903 to execute the above-described process according to the program. Further, the CPU 902 reserves a storage area corresponding to the above-described storage in the main storage device 903 according to the program.

Further, the program is a content distribution program that implements, on a computer 901, the steps of: storing live content received; controlling distributing the live content stored as chase content to be played in a delayed manner from the live content received; distributing the live content and the chase content to a viewer terminal; and changing a sound of the live content and distributes a sound having been changed to the viewer terminal.

It should be noted that the auxiliary storage device 904 is an example of a non-transitory tangible medium. Other examples of such a non-transitory tangible medium include a magnetic disk, a magneto-optical disk, a CD-ROM, a DVD-ROM, a semiconductor memory, and the like which are connected through an interface 905. In cases where the program is delivered to the computer 901 through a network, the computer 901 that has received the program may load the program into the main storage device 903 and execute the above-described process.

Further, the program may achieve a part of the above-described functions. Further, the program may be a so-called differential file (differential program) that achieves the above-described functions in combination with another program already stored in the auxiliary storage device 904.

These embodiments can be implemented in various other forms, and various omissions, substitutions and changes can be made without departing from the spirit and scope of the invention. The embodiments and variations thereof are included within the scope and spirit of the invention as defined in the appended claims.

DESCRIPTION OF REFERENCE CHARACTERS 1, 2 Content Distribution System
111 Content Distribution Server
112 Communicator
113 Controller
114 Storage
121 Live Content Distribution Device
131 Viewer Terminal
132 Terminal Communicator
133 Terminal Controller
134 Terminal Storage
135 Terminal Operation Unit
136 Terminal Player
901 Computer
902 CPU
903 Main Storage Device
904 Auxiliary Storage Device
905 Interface

The invention claimed is:

1. A content distribution server, comprising:
a storage that stores live content received;
a controller that controls distributing the live content stored in the storage as chase content to be played in a delayed manner from the live content received; and
a communicator that distributes the live content and the chase content to a viewer terminal,
wherein the controller converts a frequency of sound of the live content to a higher or a lower frequency than an original frequency, while a frequency of sound of the chase content is equal to the original frequency of the sound of the live content, and the controller distributes the sound having been changed to the viewer terminal through the communicator.

2. The content distribution server of claim 1, wherein the controller performs conversion to change a tone and/or a sound volume of the live content.

3. The content distribution server of claim 2, wherein the controller controls a degree of the change in the sound, according to a time difference between the live content and the chase content.

4. The content distribution server of claim 1, wherein the controller converts the live content stored in the storage to the chase content to be played at a faster play speed than the live content received.

5. The content distribution server of claim 4, wherein the controller controls the play speed of the chase content, according to a time, difference between the live content and the chase content.

6. The content distribution server of claim 1, wherein the controller determines a user-engagement level with the live content according to a number of user-posts associated with the live content per unit time and/or a number of characters associated with the live content per unit time, and transmits a notification of the user-engagement level to the viewer terminal when the controller determines that the user-engagement level is high.

7. The content distribution server of claim 6, wherein the controller distributes the live content together with or in place of distributing the chase content to the viewer terminal when the controller determines that the user-engagement level is high.

8. The content distribution server of claim 1, wherein the live content with the frequency of sound converted to the higher or a lower frequency than the original frequency is configured to be played by the viewer terminal.

9. A terminal device, comprising:
a storage that stores live content received;
a controller that controls playing the live content stored in the storage as chase content to be played in a delayed manner from the live content received; and
a player that plays the live content and the chase content,
wherein the controller converts a frequency of sound of the live content to a higher or a lower frequency than an original frequency, while a frequency of sound of the chase content is equal to the original frequency of the sound of the live content, and the controller causes the player to play the sound having been changed.

10. A content distribution system, comprising:
a live content distribution device that transmits live content;
a terminal device that allows viewing of content; and
a content distribution server that receives the live content from the live content distribution device,
the content distribution system further comprising:
a storage that stores the live content received;
a controller that controls for playing the live content stored in the storage as chase content to be played in a delayed manner from the live content received; and
a player that plays the live content and the chase content,
wherein the controller converts a frequency of sound of the live content to a higher or a lower frequency than an original frequency, while a frequency of sound of the chase content is equal to the original frequency of the sound of the live content, and the controller plays the sound having been changed on the viewer terminal.

11. A content distribution method, comprising steps of:
storing, by a storage, live content received;
controlling, by a controller, distributing the live content stored in the storage as chase content to be played in a delayed manner from the live content received; and
distributing, by a communicator, the live content and the chase content to a viewer terminal; and
converting a frequency of sound of the live content to a higher or a lower frequency than an original frequency, while a frequency of sound of the chase content being equal to the original frequency of the sound of the live content, and distributing the sound having been changed to the viewer terminal through the communicator, by the controller.

12. A content play method, comprising steps of:
storing, by a storage, live content received;
controlling, by a controller, playing the live content stored in the storage as chase content to be played in a delayed manner from the live content received;

playing the live content and the chase content by a player; and converting a frequency of sound of the live content to a higher or a lower frequency than an original frequency, while a frequency of sound of the chase content being equal to the original frequency of the sound of the live content, and causing the player to play the sound having been changed, by the controller.

13. A non-transitory computer readable medium storing a content distribution program for implementing, on a computer, a method comprising:

storing live content received;

controlling distributing the live content stored as chase content to be played in a delayed manner from the live content received;

distributing the live content and the chase content to a viewer terminal; and converting a frequency of sound of the live content to a higher or a lower frequency than an original frequency, while a frequency of sound of the chase content being equal to the original frequency of the sound of the live content, and distributing the sound having been changed to the viewer terminal.

14. A non-transitory computer readable medium storing a content player program for implementing, on a computer, a method comprising:

storing live content received;

controlling playing the live content stored as chase content to be played in a delayed manner from the live content received;

playing the live content and the chase content; and converting a frequency of sound of the live content to a higher or a lower frequency than an or frequency, while a frequency of sound the chase content being equal to the original frequency of the sound of the live content, and playing the sound having been changed.

* * * * *